US008640554B2

(12) United States Patent
Gebhart

(10) Patent No.: US 8,640,554 B2
(45) Date of Patent: Feb. 4, 2014

(54) METHOD AND APPARATUS FOR BEARING THRUST MONITORING

(71) Applicant: FLSmidth Sioux City, Inc., South Sioux City, NE (US)

(72) Inventor: Walter M. Gebhart, South Sioux City, NE (US)

(73) Assignee: FLSmidth Sioux City, Inc., Sioux City, NE (US)

( * ) Notice: Subject to any disclaimer, the term of this patent is extended or adjusted under 35 U.S.C. 154(b) by 0 days.

(21) Appl. No.: 13/920,632

(22) Filed: Jun. 18, 2013

(65) Prior Publication Data

US 2013/0318807 A1    Dec. 5, 2013

Related U.S. Application Data

(63) Continuation of application No. 13/093,103, filed on Apr. 25, 2011, now Pat. No. 8,485,052, which is a continuation of application No. 11/667,399, filed as application No. PCT/US2005/041145 on Nov. 14, 2005, now Pat. No. 7,997,153.

(60) Provisional application No. 60/627,629, filed on Nov. 12, 2004.

(51) Int. Cl.
*G01L 5/12*     (2006.01)
*G02B 13/00*    (2006.01)

(52) U.S. Cl.
USPC .............................. 73/862.49; 73/1.75; 73/1.78

(58) Field of Classification Search
USPC ......... 73/1.01, 7.75, 1.77–1.79, 432.1, 865.9, 73/866.5, 862.49; 702/94, 58
See application file for complete search history.

(56) References Cited

U.S. PATENT DOCUMENTS

| 3,188,155 | A  | * | 6/1965  | Kemnitz ........................ 73/862.49 |
| 3,517,915 | A  | * | 6/1970  | Deynat et al. .................. 384/549   |
| 4,129,036 | A  | * | 12/1978 | Bliemeister ................... 73/862.49 |
| 4,533,319 | A  | * | 8/1985  | Mathews et al. ............... 432/115    |
| 5,613,782 | A  | * | 3/1997  | Korting et al. ................. 384/549   |
| 6,164,117 | A  | * | 12/2000 | Passwater et al. ............. 73/1.78    |
| 6,457,295 | B1 | * | 10/2002 | Arnold ............................ 177/135  |
| 6,792,382 | B2 | * | 9/2004  | Kunitomo ..................... 702/154   |
| 6,934,629 | B1 | * | 8/2005  | Chisholm et al. ............. 340/988    |
| 7,107,168 | B2 | * | 9/2006  | Oystol et al. .................. 702/85    |

* cited by examiner

*Primary Examiner* — Lisa Caputo
*Assistant Examiner* — Jonathan Dunlap
(74) *Attorney, Agent, or Firm* — James L. Young; Westman, Champlin & Koehler, P.A.

(57) ABSTRACT

A method and apparatus for bearing thrust monitoring allows measurable detection of tilt of a support bearing a roller which rotatably supports a rotating body. A tilt meter adapted to measurably detect a tilt of the support bearing is coupled to the support bearing, where the tilt is defined as an angular difference in bearing orientation between a first bearing position and a second subsequent bearing position that is cause by an axial thrust on the rotary body. Once tilt is detected, the bearing orientation of the support bearing can be adjusted to return the support bearing to substantially the first bearing position.

19 Claims, 5 Drawing Sheets

METHOD AND APPARATUS FOR BEARING THRUST MONITORING

CROSS-REFERENCE TO RELATED APPLICATION(S)

This is a continuation of U.S. patent application Ser. No. 13/093,103, filed on Apr. 25, 2011, which is a continuation of U.S. patent application Ser. No. 11/667,399, filed on May 9, 2007, and issued as U.S. Pat. No. 7,997,153 on Aug. 16, 2011, the disclosure of which is incorporated by reference in its entirety. U.S. patent application Ser. No. 11/667,399 is a U.S. national phase application of International Patent Application No. PCT/US2005/041145, having an international filing date of Nov. 14, 2005; which claims priority to U.S. Provisional Patent Application No. 60/627,629, filed on Nov. 12, 2004, the disclosures of which are incorporated by reference in their entireties.

BACKGROUND

This invention relates to a bearing thrust monitoring assembly and a method for aligning a bearing configured to support a rotary body, particularly a large rotary body such as a hot, rotary kiln.

Large rotating cylinders are used in carrying out a large number of economically important processes. Such rotary, trunnion supported equipment typically includes a steel tube that may be quite long (up to several hundred feet in length), and that is supported by annular tires spaced along the length of the tube. Each tire is carried on a pair of opposed rollers, which in turn may be mounted upon a concrete pier or pad. The steel tube is rotated about its longitudinal axis, and is supported for such rotation by contact of the rollers with the tires surrounding the tube. The rollers are supported upon the piers or pads by roller support bearings. These are typically sleeve bearings on the larger equipment and antifriction bearings on smaller sized equipment. Due to the wear and tear of the roller support bearings, the rollers, and the tires, and distortion of various parts of the system (including possible movement of the piers or pads upon which such rotary equipment is mounted), the rollers can get out of alignment so as to cause portions of the equipment to rotate about different rotational axes. Since the cost of replacing the tires or rollers, or both, is relatively high, an important consideration in the operation of such rotary equipment is the maintenance of proper alignment between the surface of a roller and the supporting tire to prevent uneven wearing of the respective surfaces and overloading the bearings. If the two are kept in proper alignment, a long life can be expected from the tire and the rollers and the bearings.

Alignment relationships are complicated by the fact that such rotary equipment is typically constructed with the tube on a slight slope relative to horizontal to facilitate the flow of material therethrough. Thus, the tube exerts an axial force due to gravity (as well as other axial loads that may be place upon it in operation), thereby causing an axial thrust load to exist on the rollers and their associated roller support bearings whenever they are required to counteract gravity to keep the tube running on the rollers. In order to maintain proper alignment between the tube and roller support bearings, it has previously been necessary to periodically check the alignment by visual inspection or by sophisticated alignment measurements, to determine roller axial position as best possible. But since such measurements can never be accurate enough, incremental roller adjustments for skew are made until the roller shifts axially into a desired position that is approximately parallel with the axis of the tube. Sleeve bearing arrangements are configured to allow an axial shift of the roller and shaft assembly of approximately 6 mm for this purpose. In this way, the skew adjustment causes this axial shift whenever the neutral skew position is crossed. However, this method is inadequate whenever antifriction bearings are employed, because they are required to be locked to the roller shaft either by shrinking or other mechanical means. No allowance for physical axial shift between the bearing and shaft exists. Since the amount of skew adjustment to cause a roller to shift axially is on the order of 0.1 mm (0.004 inches) no matter what size of roller, even as large as 10 feet in diameter, it is all but impossible to measure skew since the axis of rotation of the tube can never by physically established to that fineness. Since antifriction bearings by their very design do not allow any such axial shift, the checks must be made relatively often, are difficult to evaluate, very subjective, and in most instances are not dependably carried out by the operator.

SUMMARY

The present invention stems from the appreciation that a bearing for a roller-supported rotating body tilts upon application of an axial thrust load on the rotating body. In one aspect, the invention is embodied in a method for aligning a bearing for a roller that is configured to support a rotary body, where the method comprises measurably detecting a tilt of the bearing, wherein the tilt is defined as an angular difference in bearing orientation between a first bearing position and a second subsequent bearing position that is caused by an axial thrust load on the rotary body, and adjusting bearing orientation of the bearing to return the bearing to substantially the first bearing position.

In another aspect, the present invention is embodied in a method for detecting an axial force exerted on a rotary body mounted on a roller that is rotatably supported on a support bearing, with the method characterized by monitoring change in inclination of the support bearing.

In another aspect, the present invention is embodied as a bearing thrust monitoring assembly. The bearing thrust monitoring assembly comprises a roller, a support bearing for rotatably supporting the roller and having a bearing rotary axis, a rotary body mounted on the roller for rotation relative to the roller and bearing along a rotary body axis, and a device coupled to the support bearing and adapted to detect the tilt of the support bearing. In this regard, the tilt is defined as an angular difference in bearing orientation of the support bearing between a first bearing position and second bearing position caused by an axial thrust load on the rotary body.

BRIEF DESCRIPTION OF THE DRAWINGS

The present invention will be further explained with reference to the attached figures, wherein like structure or features are referred to by like reference numerals throughout the several views.

Figure 1:
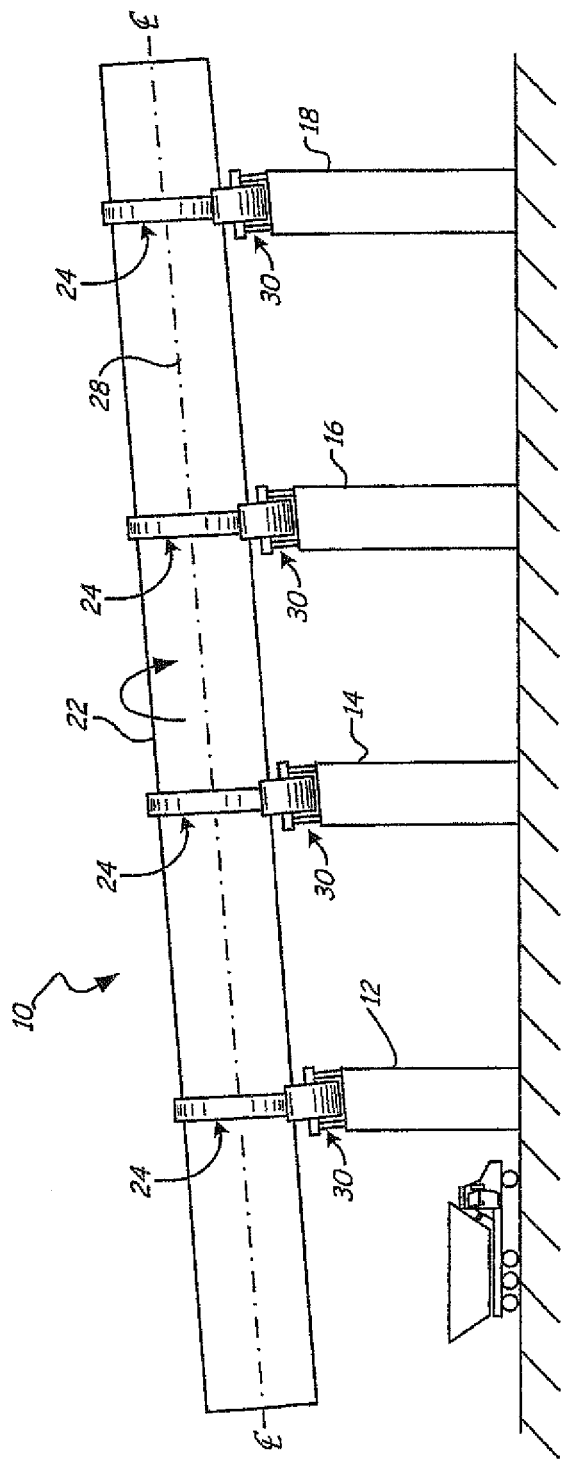
FIG. 1 is a schematic, side elevation of a portion of a typical rotary drum arrangement.

While the above-identified figures set forth one or more embodiments of the present invention, other embodiments are also contemplated, as noted in the disclosure. In all cases, this disclosure presents the invention by way of representation and not limitation. It should be understood that numerous other modifications and embodiments can be devised by those skilled in the art which fall within the scope and spirit of the principles of this invention.

DETAILED DESCRIPTION

An inclined rotary drum 10, being generally of a high length to diameter ratio, is rotatably mounted upon piers 12, 14, 16 and 18. Rotary drum 10 has a rotatable tube or shell 22. Adjacent each pier, the tube 22 has a tire 24 which defines a circumferential bearing surface 26 which is generally cylindrical and coaxial to a longitudinal axis 28 of the tube 22. The bearing surface 26 of each tire 24 is supported by a pair of roller assemblies 30 and 32. The roller assemblies 30 and 32 are arranged in pairs along the length of the tube 22, are aligned and configured to support the tube 22, and are generally identical. Each roller assembly 30 and 32 has a cylindrical roller 34 and 36, and each roller has a circumferential bearing surface 38 and 40, respectively, which is in supporting engagement with the bearing surface 26 of its respective tire 24.

Figure 2:
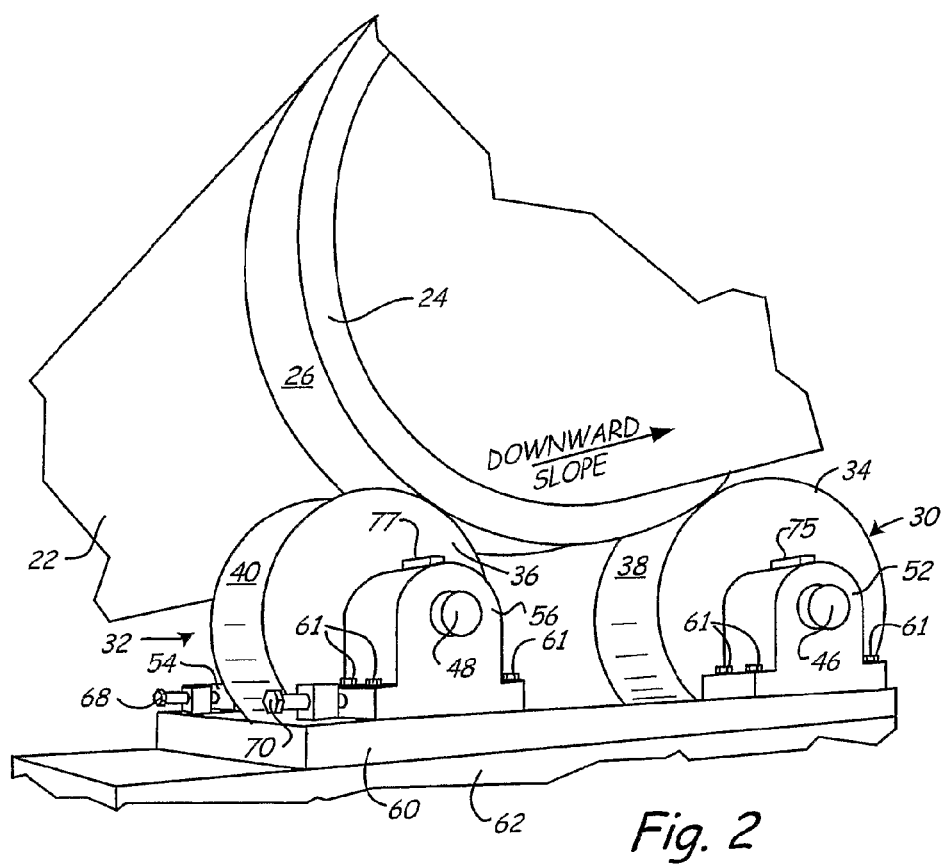
FIG. 2 is a partial perspective view showing a pair of opposed rollers and associated roller support bearings for a tire on a rotary drum.
Figure 3:
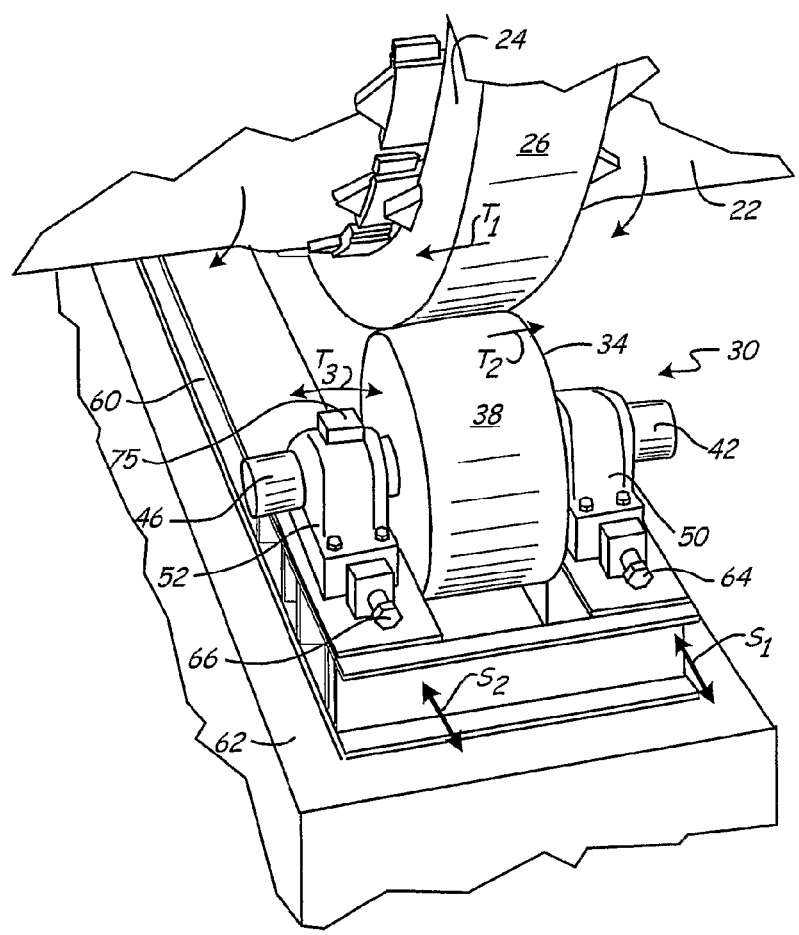
FIG. 3 is a partial perspective view showing the relationship between a roller and a tire on a rotating tube of a rotary drum.

Each roller 34 and 36 has an upstream roller shaft extension (see shaft extension 42 for roller 34, in FIG. 3) and a downstream shaft extension (see shaft extensions 46 and 48 for rollers 34 and 36, respectively, in FIG. 2). As used herein, the "upstream" and "downstream" orientations are relative to the direction of material flow through the rotating body. The shaft extensions are rotatably supported by bearings. In FIG. 3, bearings 50 and 52 are shown for shaft extensions 42 and 46 of roller 34, respectively. In FIG. 2, bearings 52 and 54 are shown for the shaft extensions of roller 34. Such bearings may constitute sleeve bearings or antifriction bearings, spherical roller bearings, for example. Each bearing thus essentially constitutes one of a pair of bearings for its respective roller. In the case of antifriction bearings, one bearing of the pair will contain a fixing ring and the other bearing of the pair will be a free bearing.

The bearings are fixedly mounted to a base 60 (at least with respect to axial movement there between) by hold down bolts 61 or other suitable fastening means. The base 60 is typically formed from a steel frame made of heavy H-section steels channels which are welded together. The base 60 is anchored to a foundation 62 which may take the form of a pier (such as piers 12, 14, 16 or 18) or a foundational pad. The foundation 62 is typically formed from concrete, and the base 60 is anchored to the foundation, either by fasteners such as bolts (not shown) or by forming the base 60 into the concrete of the foundation 62 itself.

While the bearings (such as bearings 50, 52 and 56) are fixed to the base 60, they are capable of skew adjustment by means of adjusting screws, such as adjusting screws 64 and 66 for bearing assembly 30 (FIG. 3, which further illustrates potential skew adjustment by arrows $S_1$ and $S_2$) and adjusting screws 68 and 70 for bearing assembly 32 (FIG. 2). The adjusting screws allow for skew adjustment of the axis of each of the rollers 34 and 36 with respect to the axis of the tire 24, as is known in form and structure in the art. Such skew adjustments are made while the equipment is rotating, with the hold down bolts 61 released enough to allow the bearings to slide (transverse to the axis of the roller) relative to the base 60. Some bearings are not mounted to the base by hold down bolts, but are prevented from axial movement relative to the base by keys.

Although the discussion herein and illustrations depict a rotary kiln, the present invention is applicable on any rotating body supported on trunnion rollers. Such rotating bodies include, for example, rotary kilns, rotary coolers, rotary dryers, rotary furnaces, rotating reactors, rotary filters, bean conditioners, rotary ash cylinders, mill shell bearing surfaces, delacquerers, washers, debarking drums, pelletizers, coal breakers, granulators, incinerators, and shakeout drums, among others.

The present invention provides a simple and objective means for detecting the presence of an axial load on a rotating shaft (such as the rotating tube 22 of rotary kiln 10) supported by two rollers (such as roller assemblies 30 and 32). In one embodiment the present invention is an external add-on that is universally applicable to existing roller assemblies and their associated bearings in any style or type, sleeved bearings or antifriction bearings, and requires no modifications to the bearings. One aspect of the inventive method is that of measurably detecting the relative tilt, where tilt is defined as an angular difference in bearing orientation between a first bearing position and a second subsequent bearing position (that is caused by an axial thrust load on the rotary body). Stated another way, the inventive method monitors change in inclination of a support bearing for a rotary body.

The typical sleeve bearing arrangements for a roller allow an axial shift of the roller of 6 mm to determine the neutral point. Often, it is required for these rollers to be skewed to counteract the gravitational pull on the rotary body. The rollers will then seat themselves downhill and then carry a thrust load. The present invention can then confirm that this has been done and also provide means for equally balancing the thrust load or otherwise distribute the thrust load to be carried by each roller supporting the rotary body.

Whenever a shaft such as the tube 22 shown in FIG. 1 is loaded axially, the supportive bearings tilt a small amount. By using a sensitive tilt meter, this tilting may be readily monitored. Knowing the presence of thrust load is an important part of setting the bearings for proper alignment, and also for preventing bearing failure over the long term. One application where this is critical is that of roller supported equipment such as rotary kilns and rotary dryers. As noted above, these are examples of the many types of roller supported rotary drums that are found in many different industries. When the roller axis is not parallel to the axis of the rotating drum or tube, a thrust load is created which can lead to severe surface wear of the faces in rolling contact and can create enough axial force to cause bearing failure. With this type of equipment, the large steel rings or tires that are mounted on the shell or tube, and which always sit on the rollers (as seen in FIGS. 1, 2 and 3) always have a small wobble as they rotate. This wobble introduces a cyclical thrust load to the supporting rollers. Thrust can therefore come from two sources: (1) poor roller alignment, and (2) the wobbling tire on the rotating tube.

Any skew between the axes of a roller and its respective tire on the tube creates a thrust load (as illustrated in FIG. 3 by the opposed resultant thrusts on the tire 24 and roller 34, shown by arrows $T_1$ and $T_2$, respectively), which in turn causes the bearing for that roller to tilt. The direction of tilt (to left or right as viewed in FIG. 3, as illustrated by tilt arrow $T_3$) will reflect the direction of thrust, which could be either way as well. The degree of tilt will be a function of many parameters, such as style of bearing, stiffness of its housing, stability of the base, stability of the foundation and stability of the ground conditions, speed of rotation and weight of the drum. Sorting out where the tilt is actually coming from will involve making bearing skew adjustments (through trial and error) to observe the changes in tilt.

Figure 5:
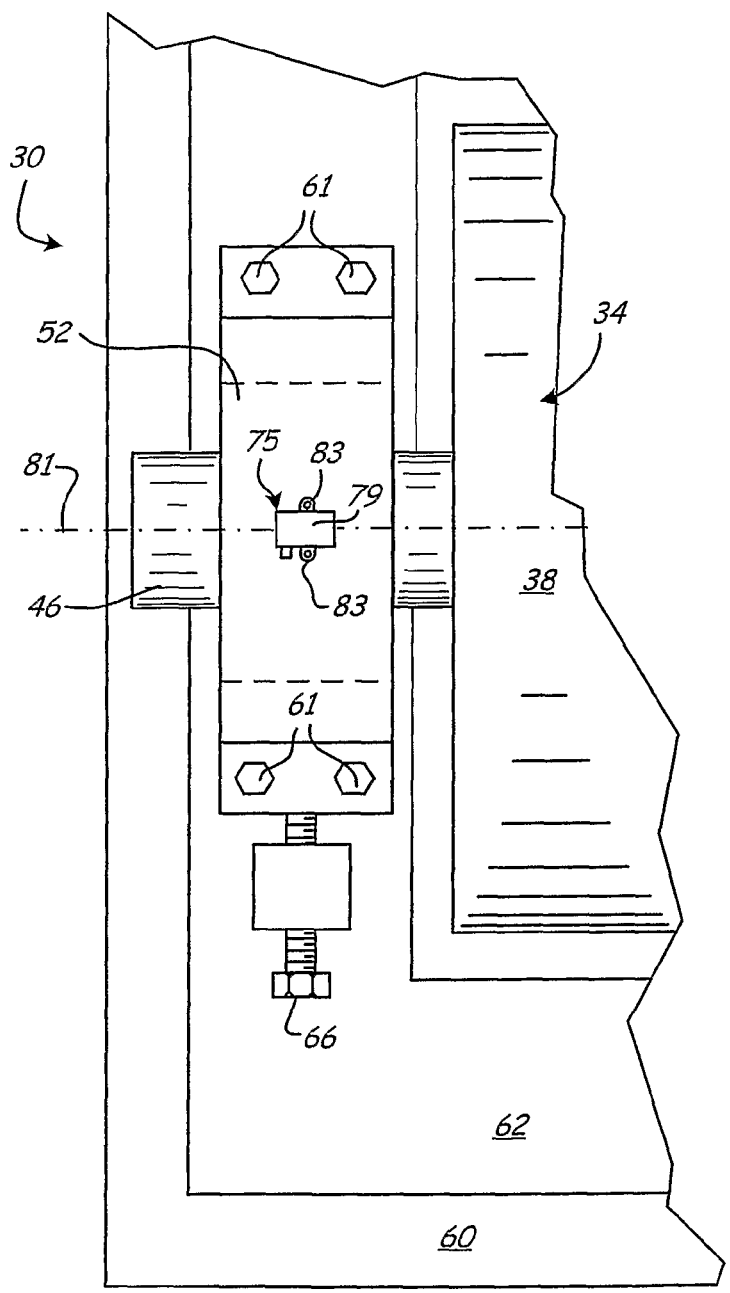
FIG. 5 is a partial top view of a roller assembly for a rotary drum, with the rotating tube and its associated tire not shown for clarity of illustration.

In order to detect and monitor tilt of the bearing for a roller, the present invention employs a highly sensitive tilt meter mounted on the bearing (or a support structure or housing for the bearing), such as tilt meter 75 on bearing 52 and tilt meter 77 on bearing 56 (see FIG. 2). Such a tilt meter can measure tilt over a range of +/−40 arc minutes. It can detect changes as small as one arc second (0.0028 degree). Such a tilt meter may also provide an output signal dependent on detected tilt. In one embodiment, the tilt meter has a range of +/−40 arc minutes, which corresponds to an output signal range of +/−2500 millivolts. As illustrated in FIGS. 2 and 3, tilt meters 75 and 77 are fixedly mounted to their respective bearings 52 and 56. For example, as seen in FIG. 5, tilt meter 75 has an outer casing 79 which is fixedly mounted to the bearing 52 (so that the tilt meter is in parallel alignment with a bearing rotary axis 81 of roller 38) by suitable fasteners, such as threaded fasteners 83. In the case of an antifriction bearing, the tilt meter would be mounted to the bearing of the bearing pair that has the fixing ring.

In one embodiment, each tilt meter comprises an electrolytic tilt sensor housed in a compact, waterproof enclosure (e.g., casing 79). The tilt sensor is a precision liquid-level that is sensed electrically as a resistance bridge. The bridge circuit outputs a voltage proportional to the tilt of the sensor. The tilt meter may be read manually, and thus changes in inclination are found by comparing the current reading to an initial reading. The tilt meter may also be connected to a data logger or a processor, and will provide an electrical signal as a function of detected tilt (e.g., a voltage reading), and thus can be frequently read. These readings can be used to perform calculations and monitoring of the tilt and rate of change of tilt relative to desired preset limitations.

In one embodiment, the casing 79 housing the tilt meter is a small rugged enclosure, and can be mounted to any existing bearing without modification to the existing bearing or its support or housing assembly. Thus, such a tilt meter can be used as a temporary mount in situations where monitoring of the bearing will only be used for initial setup and alignment, or may be established as a permanent installation for continuous ongoing monitoring during normal operations of a rotating body, 24 hours per day, 7 days per week.

Figure 4:
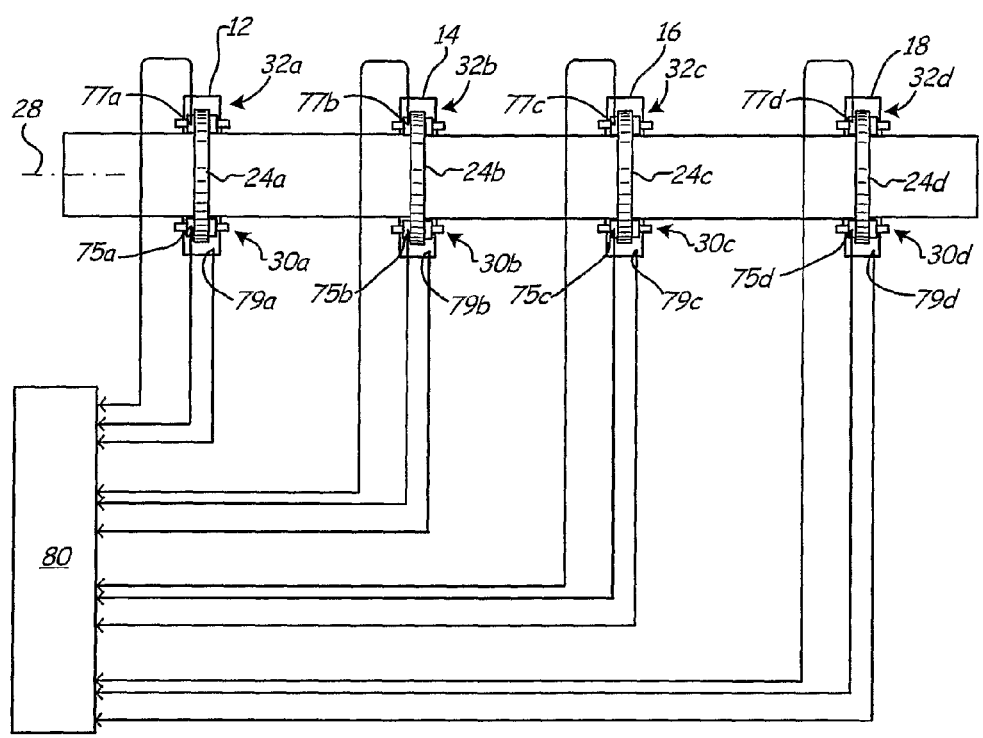
FIG. 4 is a schematic illustration of a computerized monitoring arrangement for monitoring the tilt orientation of the rollers on a rotary drum.

FIG. 4 illustrates schematically an arrangement wherein a rotary drum. 10 has a rotatable tube 22 supported by a plurality of tires 24a, 24b, 24c and 24d. Each tire is in turn supported by a respective pair of roller assemblies, such as roller assemblies 30a and 32a for tire 24a, roller assemblies 30b and 32b for tire 24b, roller assemblies 30c and 32c for tire 24c, and roller assemblies 30d and 32d for tire 24d. Each roller assembly 30a, 30b, 30c and 30d is provided with an associated tilt meter 75a, 75b, 75c and 75d, respectively. Likewise, each roller assembly 32a, 32b, 32c and 32d is provided with an associated tilt meter 77a, 77b, 77c and 77d, respectively. Each tilt meter provides an output signal relative to bearing orientation which is delivered (either by hard wiring means or by wireless means) to a processor 80. The processor can thus continuously monitor the output signals from the tilt meter of each roller assembly for detecting when a skew adjustment is necessary in order to compensate for axial thrust or load. As noted above, such skew adjustments are possible using the skew adjustment screws 64 and 66 for bearing assembly 30 or adjustment screws 68 and 70 for bearing assembly 32, as is known. Thus, the inventive method for aligning a bearing configured to support a rotary body comprises not only detecting a tilt of the bearing, but also adjusting bearing orientation of that bearing to return the bearing to substantially the first bearing position.

In part, the present invention is an appreciation that a bearing housing or bearing such as bearings 52, 54 and 56 (FIGS. 2 and 3) do tilt as a consequence of axial thrust load, even though such bearings are fixably mounted (with respect to relative axial movement) to the base 60 and their foundation 62. Such tilt, even on a very small scale (e.g. one arc second) can be compensated for via skew adjustment for that bearing and by doing so, the life of the roller bearing assembly and tire (and hence the life of the rotary drum) can be extended, as well as achieving a significant reduction in maintenance costs.

Roller supported rotating equipment often experiences bearing failures when roller skew alignment is incorrect. It is one of the single biggest problems in the mechanical operation of such equipment. Roller assemblies can cost from a few hundred dollars for a typical dryer installation to over a hundred thousand dollars each for the largest bearings (that can have shafts up to 36 inches in diameter and rollers as large as 10 feet in diameter supporting over 1200 metric tons). The ability to monitor and adjust for neutral thrust is a significant advantage in aligning and maintaining such equipment.

The present invention works with any kind of bearing, including specifically spherical roller bearings used on such machines as rotary coolers, rotary dryers and rotary granulators. A key aspect of the invention is identifying the fact that due to a thrust load placed upon a support roller, the bearings supporting that roller will tilt (even when seemingly securely anchored in place), and the development of a system for sensing such tilt which is relatively easily and inexpensively mounted on many different types of roller bearings (without extensive retrofit requirements or system shut down time). Because of the potentially harsh operating conditions which such roller bearings are used in, the tilt meter and its related field components must be durably housed. Such operating conditions might include extreme high and low temperatures, dust and debris, moisture from outside exposure, exposure to sunlight, humidity variations, etc.

Typically, the tilt meters of the present invention will be mounted on existing rotary equipment, or at least mounted after a new installation has been assembled. In order to establish an initial set point to manually adjust the tilt meter to zero tilt, a nominal zero thrust condition must be established. To do so, the tube 22 and its tire 24 are momentarily lifted up off of its associated roller assemblies 30 and 32. The tube is then replaced back down on the roller assemblies 30 and 32, but no rotation is initiated. This is then deemed the point of zero thrust, and the tilt meter is manually set or calibrated as close to the center of its sensor range as possible (a zero tilt initial condition is thus established). This does not necessarily mean that the tube itself is horizontal. As illustrated in FIG. 1, most rotary drums are actually mounted with the tube in a sloped condition, and the magnitude of the slope will vary from installation to installation. The function of the inventive device is thus to detect any tilt of the bearing caused by thrust from that initial "zero" position.

Once rotation of the tube is initiated, if a thrust load is present during rotation through skewing of the axes of the tube and a roller assembly, the tilt meter will so indicate as a deviation from its initial zero position. The tilt meter in operation will provide a signal indicative of increasing or decreasing tilt caused by a thrust load on the roller (thus indicating the axial direction of the thrust load).

The present invention illustrates where a bearing's neutral tilt point is and the thrust direction of an axial load on that bearing. The absolute value of the thrust load in pounds force is not needed and would be quite difficult to calculate, but could be calibrated by providing a separate, external axial load of known magnitude, to mimic any given tilt. The simple means provided by the present invention of providing the ability to observe if thrust is increasing or decreasing upon a bearing, and thus finding the "neutral skew" setting of a roller and tire assembly for a rotatable tube, is an invaluable tool for aligning and preventing bearing failures due to excessive skew (i.e., excessive thrust load).

As noted above, the tilt meter arrangement of the present invention can be mounted on any bearing for a roller assembly of any size and style, without any significant modifications to the existing bearing or roller assembly. In addition, no specially engineered components are required. A standard tilt sensor of high sensitivity can be calibrated for most situations, or a tilt meter of different sensitivities may be employed for a particular situation. The tilt meter arrangement of the present invention is universal in application, and the data output that can be provided can be as simple as a series of lights (indicating thrust direction and relative magnitude) to data logging by a computer to compare changes of thrust with other data such as production rates, speed of rotation, the presence of lubrication, or other physical data such as temperature changes of the rotary drum. The tilt meter arrangement of the present invention provides a relatively low cost and simple to apply system for enhancing maintenance monitoring in existing rotary equipment installations.

In one embodiment, one or more tilt meters are mounted on the foundation for each pair of rollers to monitor foundational movement if caused by forces other than roller thrust. For example, in FIG. 4, foundation tilt meters 85a, 85b, 85c and 85d are fixedly mounted on the foundations of piers 12, 14, 16 and 18, respectively. Each of the foundation tilt meters 85a, 85b, 85c and 85d can thus provide an indication of relative tilt of the respective foundation, where such tilt is defined as an angular difference in orientation of the bearing foundation between a first bearing foundation position and a second subsequent bearing foundation position. Like the bearing tilt meters 75 and 77 discussed above, a signal from each of the foundation tilt meters 85a, 85b, 85c and 85d may also be provided to a processor 80 for further monitoring and analysis. For instance, the processor may calculate a net tilt of the bearing, wherein the net tilt is generally equal to the difference between the tilt of the bearing and the tilt of the bearing foundation.

For any given rotating body (such as the tube 22 of rotary kiln 10), there will be at least a plurality of roller assemblies (e.g. four rollers) supporting two axially spaced tires. At least one tilt meter is provided on a bearing for each roller assembly, although more could be provided and, as mentioned above, in some instances, additional tilt meters may be mounted on the roller bearing foundation to detect and compensate for foundation movement (or other possible external forces). In one embodiment, a signal from each tilt meter is processed by a computerized monitoring system, and can be transmitted to a central monitoring station, either by hardwire or by wireless technology, or can be provided to a remote location for monitoring by long distance transmission (such as via the internet or other suitable signal communications media). Once a tilt in a bearing is detected because of a thrust load, it may be compensated for by, for example, adjustment of the skew adjustment controls on that bearing's roller assembly (see, e.g., FIGS. 2 and 3) in order to return the bearing (and its associated roller assembly) to the desired neutral thrust position. Such compensation is done while the rotary kiln 10 is in operation, or, in other words, while the tube 22 is rotating. In addition, the tilt orientation of multiple bearings for a tube may be balanced, as each will affect the other. Thus, the bearing orientation of each bearing can be adjusted as a function of the detected tilt of that bearing and the determined direction of tilt of that bearing, and as a function of the detected tilt of other bearings and the determined directions of tilt of those other bearings.

Although the present invention has been described with reference to preferred embodiments, workers skilled in the art will recognize that changes may be made in form and detail without departing from the spirit and scope of the invention.

What is claimed is:

1. A system for monitoring skew of rollers supporting a rotary body, the system comprising:
    a tilt sensor having a housing that is configured to be mounted to an exterior surface of an associated roller bearing; and
    a processor configured to communicate with the tilt sensor, and further configured to monitor angular differences in bearing orientations with the tilt sensor, wherein each of the bearing orientations is about a vertical axis between a first position of the associated roller bearing and a second subsequent position of the associated roller bearing that is caused by an axial thrust load on the rotary body.

2. The system of claim 1, wherein the tilt sensor comprises an electrolytic tilt sensor.

3. The system of claim 1, wherein the tilt sensor is configured to be mounted to the exterior surface of the associated roller bearing in a manner that does not modify the associated roller bearing.

4. The system of claim 1, wherein the tilt sensor is further configured to be unmounted from the associated roller bearing in a manner that does not modify the associated roller bearing.

5. The system of claim 1, wherein the rotary body comprises a rotary kiln.

6. The system of claim 1, wherein the processor is further configured to derive a direction of the axial thrust load as a function of the monitored angular differences in bearing orientations.

7. The system of claim 1, and further comprising an electrical wire operably interconnecting the tilt sensor and the processor.

8. A system for monitoring skew of rollers supporting a rotary body, the system comprising:
    a plurality of tilt sensors each having a housing that is configured to be mounted to an exterior surface of an associated roller bearing; and
    a processor configured to communicate with each of the tilt sensors, and further configured to monitor angular differences in bearing orientations with each of the tilt sensors, wherein each of the bearing orientations is about a vertical axis between a first position of the associated roller bearing and a second subsequent position of the associated roller bearing that is caused by an axial thrust load on the rotary body.

9. The system of claim 8, wherein the plurality of tilt sensors are configured to be mounted to separate associated roller bearings.

10. The system of claim 8, wherein the tilt sensor comprises an electrolytic tilt sensor.

11. The system of claim 8, wherein the tilt sensor is further configured to be unmounted from the associated roller bearing in a manner that does not modify the associated roller bearing.

12. The system of claim 8, wherein the rotary body comprises a rotary kiln.

13. A method for monitoring and reducing skew of rollers supporting a rotary body, the method comprising:

mounting a housing of a tilt sensor to an exterior surface of an associated roller bearing;

measurably detecting angular difference in bearing orientation with the tilt sensor about a vertical axis between a first position of the associated roller bearing and a second subsequent position of the associated roller bearing that is caused by an axial thrust load on the rotary body; and providing an output signal from the tilt sensor to a processor, wherein the output signal is based on the measurably detected angular difference in bearing orientation.

14. The method of claim 13, wherein mounting the housing of the tilt sensor to the exterior surface of the associated roller bearing comprises mounting the housing in a manner that does not modify the associated roller bearing.

15. The method of claim 13, and further comprising unmounting the tilt sensor from the associated roller bearing in a manner that does not modify the associated roller bearing.

16. The method of claim 13, and further comprising deriving a direction of the axial thrust load as a function of the measurably detected angular difference in bearing orientation.

17. The method of claim 13, wherein the rotary body comprises a rotary kiln.

18. The method of claim 13, wherein the tilt sensor comprises an electrolytic tilt sensor.

19. The method of claim 13, and further comprising performing a skew adjustment on a roller for the associated roller bearing to reduce the angular difference in bearing orientation.

\* \* \* \* \*